US011959435B1

(12) United States Patent
Yu et al.

(10) Patent No.: US 11,959,435 B1
(45) Date of Patent: Apr. 16, 2024

(54) TURBULENT JET CONTROLLED COMPRESSION IGNITION (TJCCI) ENGINE

(71) Applicant: ARAMCO SERVICES COMPANY, Houston, TX (US)

(72) Inventors: Xin Yu, New Hudson, MI (US); Anqi Zhang, Canton, MI (US); Yu Zhang, Novi, MI (US); Andrew Baur, Whitmore Lake, MI (US); David Cleary, West Bloomfield, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/050,330

(22) Filed: Oct. 27, 2022

(51) Int. Cl.
*F02D 41/30* (2006.01)
*F02B 19/12* (2006.01)
(Continued)

(52) U.S. Cl.
CPC .......... *F02D 41/3064* (2013.01); *F02B 19/12* (2013.01); *F02D 41/0057* (2013.01);
(Continued)

(58) Field of Classification Search
CPC ...... F02B 19/00; F02B 19/12; F02D 41/0057; F02D 41/1475; F02D 41/3011–3041;
(Continued)

(56) References Cited

U.S. PATENT DOCUMENTS

| | | | |
|---|---|---|---|
| 9,856,835 B1 | 1/2018 | Coldren et al. |
| 10,066,580 B2 | 9/2018 | Assanis et al. |

(Continued)

FOREIGN PATENT DOCUMENTS

| | | |
|---|---|---|
| CN | 113756932 A | 12/2021 |
| DE | 1526290 A1 | 4/1970 |

(Continued)

OTHER PUBLICATIONS

Hua, et al., "Operation strategy optimization of lean combustion using turbulent jet ignition at different engine loads," Applied Energy, Aug. 14, 2021, 15 pages.

(Continued)

*Primary Examiner* — Hung Q Nguyen
*Assistant Examiner* — Mark L. Greene
(74) *Attorney, Agent, or Firm* — Osha Bergman Watanabe & Burton LLP

(57) ABSTRACT

A method of operating an engine includes operating the engine in first and second engine operating map regions by performing passive jet ignition combustion with a first stoichiometric fuel mixture and a first volume of residual gas. The engine is operated in a third engine operating map region by performing turbulent jet controlled compression ignition (TJCCI) with an ultra lean fuel mixture and a first volume of cooled exhaust gas recirculation, a fourth engine operating map region by performing passive jet ignition combustion with a third stoichiometric fuel mixture and a second volume of cooled exhaust gas recirculation, and a fifth engine operating map region, characterized by shutting off the engine. The engine is operated in a mode transition region between the second, third, and fourth engine operating map regions by performing passive jet ignition combustion with a second stoichiometric fuel mixture and a second volume of residual gas.

19 Claims, 9 Drawing Sheets

(51) Int. Cl.

| | |
|---|---|
| ***F02D 41/00*** | (2006.01) |
| ***F02D 41/14*** | (2006.01) |
| ***F02P 5/04*** | (2006.01) |
| ***F02P 5/15*** | (2006.01) |

(52) U.S. Cl.
CPC .......... *F02D 41/1475* (2013.01); *F02P 5/045* (2013.01); *F02P 5/1504* (2013.01); *F02P 5/1516* (2013.01); *F02D 2200/1002* (2013.01); *F02D 2200/101* (2013.01)

(58) Field of Classification Search
CPC . F02D 41/3064–307; F02D 2200/1002; F02D 2200/101; F02P 5/04–045; F02P 5/145–1504; F02P 5/1516
See application file for complete search history.

(56) References Cited

U.S. PATENT DOCUMENTS

| | | | |
|---|---|---|---|
| 10,161,296 | B2 | 12/2018 | Schock et al. |
| 11,060,443 | B1 | 7/2021 | Thomas et al. |
| 11,156,147 | B1 | 10/2021 | Yu et al. |
| 11,236,662 | B2 | 2/2022 | Zhang et al. |
| 11,300,038 | B2 | 4/2022 | Seba et al. |
| 11,371,419 | B2 | 6/2022 | Zhang et al. |
| 11,459,995 | B1 * | 10/2022 | Zyada ................. F02D 13/0261 |
| 2012/0103302 | A1 | 5/2012 | Attard |
| 2019/0145338 | A1 | 5/2019 | Tanaka et al. |
| 2021/0363913 | A1 | 11/2021 | Schock |

FOREIGN PATENT DOCUMENTS

| | | | |
|---|---|---|---|
| DE | 102018000285 | A1 | 7/2019 |
| DE | 102020110960 | A1 * | 10/2020 |
| DE | 102020117008 | A1 | 12/2021 |
| JP | 2019157638 | A | 9/2019 |

OTHER PUBLICATIONS

Schumacher et al., "Pre-chamber Ignition System for Homogeneous Lean Combustion Processes with Active Fuelling by Volatile Fuel Components," Thesis, Dec. 14, 2018, 19 pages.

International Search Report issued in International Application No. PCT/US2023/077795 dated Feb. 27, 2024 (5 pages).

Written Opinion issued in International Application No. PCT/US2023/077795 dated Feb. 27, 2024 (6 pages).

* cited by examiner

TURBULENT JET CONTROLLED COMPRESSION IGNITION (TJCCI) ENGINE

BACKGROUND

Internal combustion engines may generally operate by combusting a fuel mixture within a main combustion chamber, where the combustion may force movement of one or more components in the engine. A typical internal combustion engine may include multiple cylinders defining the main chambers within an engine block, where combustion within a cylinder moves an internal piston, which may in turn move a crankshaft of the engine. A fuel mixture may be directed through an inlet into the main chamber and combusted.

Combustion within a main chamber of an internal combustion engine may be generated using different mechanisms, such as using high pressure and high temperature conditions or using an ignition device. A common ignition device set up requires a continuous ignition source, or spark, to be produced such that combustion is created by sparking an air and fuel mixture in the main chamber of the engine. Conventionally, the spark is created by energizing a copper ignition rod and placing the energized ignition rod within a set distance to a grounded nickel or iridium plate, where the electrical difference between the energized ignition rod and the grounded plate creates a continuous spark. Alternatively, a portion of the air and fuel mixture may be ignited in a pre-main chamber, where the air and fuel mixture is ignited and the resulting combustion reaction is released into the main chamber to ignite the remainder of the air and fuel mixture. After combustion within the main chamber, the combustion products may exit an outlet of the main chamber as exhaust.

After combustion within the main chamber, the combustion products may exit an outlet of the main chamber as exhaust. Some internal combustion engines use exhaust gas recirculation (EGR) techniques that recirculate a portion of an engine's exhaust back to the main chamber for mixture with the air and fuel. By recirculating exhaust gases back to the main chamber of an internal combustion engine, EGR systems may be used to dilute the amount of oxygen present during combustion, thereby lowering combustion temperatures in the main chamber and lowering nitrous oxides ($NO_x$) emissions from the engine.

The timing and control of valves and combustion within an engine are often electronically controlled by a computer system. The computer system may implement a pre-determined operational schedule for allowing a fuel and air mixture into the main chamber, combustion of the mixture, and exhaust.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods of operating an engine, which may include operating an engine in a first engine operating map region and a second engine operating map region by performing passive jet ignition combustion with a first stoichiometric fuel mixture and a first volume of residual gas, operating the engine in a third engine operating map region by performing turbulent jet controlled compression ignition (TJCCI) with an ultra lean fuel mixture and a first volume of cooled exhaust gas recirculation, operating the engine in a fourth engine operating map region by performing passive jet ignition combustion with a third stoichiometric fuel mixture and a second volume of cooled exhaust gas recirculation, and operating the engine in a fifth engine operating map region, wherein the fifth engine operating map region is characterized by shutting off the engine. The engine may also be operated in a mode transition region between the second, third, and fourth engine operating map regions by performing passive jet ignition combustion with a second stoichiometric fuel mixture and a second volume of residual gas, wherein the second volume of residual gas is controlled by an ignition timing to meet a target engine load. The engine may have a cycle spanning two revolutions of a piston within the engine, where the cycle includes an exhaust stroke, an intake stroke, a compression stroke, and an expansion stroke, a gas exchange top dead center piston position located between the exhaust stroke and the intake stroke, a firing top dead center piston position located between the compression stroke and the expansion stroke, and a bottom dead center piston position located between the intake stroke and the compression stroke and between the expansion stroke and the exhaust stroke.

In another aspect, embodiments disclosed herein relate to a turbulent jet controlled compression ignition (TJCCI) engine system. The TJCCI engine system may include an engine having an engine block with a cylinder, a piston configured to move up and down inside a main chamber of the cylinder, a prechamber in fluid communication with the main chamber, and a fuel injector mounted to the engine block and in fluid communication with the main chamber. The TJCCI engine system may also include a computer system, having a memory and a processor, in communication with the piston, an exhaust valve, an intake valve, one or more fuel injectors, and a spark plug. The computer processor is configured to operate the engine in a first engine operating map region and a second engine operating map region by performing passive jet ignition combustion with a first stoichiometric fuel mixture and a first volume of residual gas, operate the engine in a mode transition region by performing passive jet ignition combustion with a second stoichiometric fuel mixture and a second volume of residual gas, wherein the second volume of residual gas is controlled by an ignition timing to meet a target engine load, operate the engine in a third engine operating map region by performing turbulent jet controlled compression ignition (TJCCI) with an ultra lean fuel mixture and a first volume of cooled exhaust gas recirculation, operate the engine in the mode transition region, operate the engine in a fourth engine operating map region by performing passive jet ignition combustion with a third stoichiometric fuel mixture and a second volume of cooled exhaust gas recirculation, and operate the engine in a fifth engine operating map region, wherein the fifth engine operating map region is characterized by shutting off the engine.

In yet another aspect, embodiments disclosed herein relate to a method that includes designing an engine to operate using passive jet ignition combustion under a first set of engine parameters. The passive jet ignition combustion may include injecting fuel from a fuel injector into a main chamber of the engine such that an amount of the fuel is directed into a prechamber to provide a prechamber fuel air mixture in the prechamber and a main chamber fuel air mixture in the main chamber, generating a spark in the prechamber to ignite the prechamber fuel air mixture, and ejecting the ignited prechamber fuel air mixture from the prechamber into the main chamber to ignite the main chamber fuel air mixture. The first set of engine parameters may include an engine speed ranging from a first minimum speed to a first maximum speed and an engine load ranging from a first minimum load to a first maximum load, wherein under the first set of engine parameters, a ratio of fuel to air provided in the main chamber and the prechamber after the injecting is a stoichiometric ratio. The method may also include designing the engine to operate using passive jet ignition combustion under a second set of engine parameters, the second set of engine parameters including the engine speed ranging from greater than the first maximum speed to a second maximum speed and the engine load ranging from the first minimum load to a second maximum load. The method may also include designing the engine to change the ratio of fuel to air provided in the main chamber and the prechamber to an ultra-lean ratio (having more air than fuel) when the engine is operated under a third set of engine parameters, wherein under the third set of engine parameters, the engine speed is greater than the first maximum speed and the engine load is greater than the second maximum load.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-10, any component described with regard to a figure, in various embodiments disclosed herein, may be equivalent to one or more like-named components described with regard to any other figure. For brevity, descriptions of these components may not be repeated for each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

In one aspect, embodiments disclosed herein relate to methods and systems of performing turbulent jet-controlled compression ignition (TJCCI) to improve engine efficiency and reduce nitrogen oxide emissions. In another aspect, embodiments disclosed herein relate to methods of passively fueling a prechamber and performing different combustion strategies pertaining to a designed engine operating map. In yet another aspect, embodiments disclosed herein relate to methods of designing an engine to operate in multiple engine operating regions depending on the engine speed and engine load.

Figure 1:
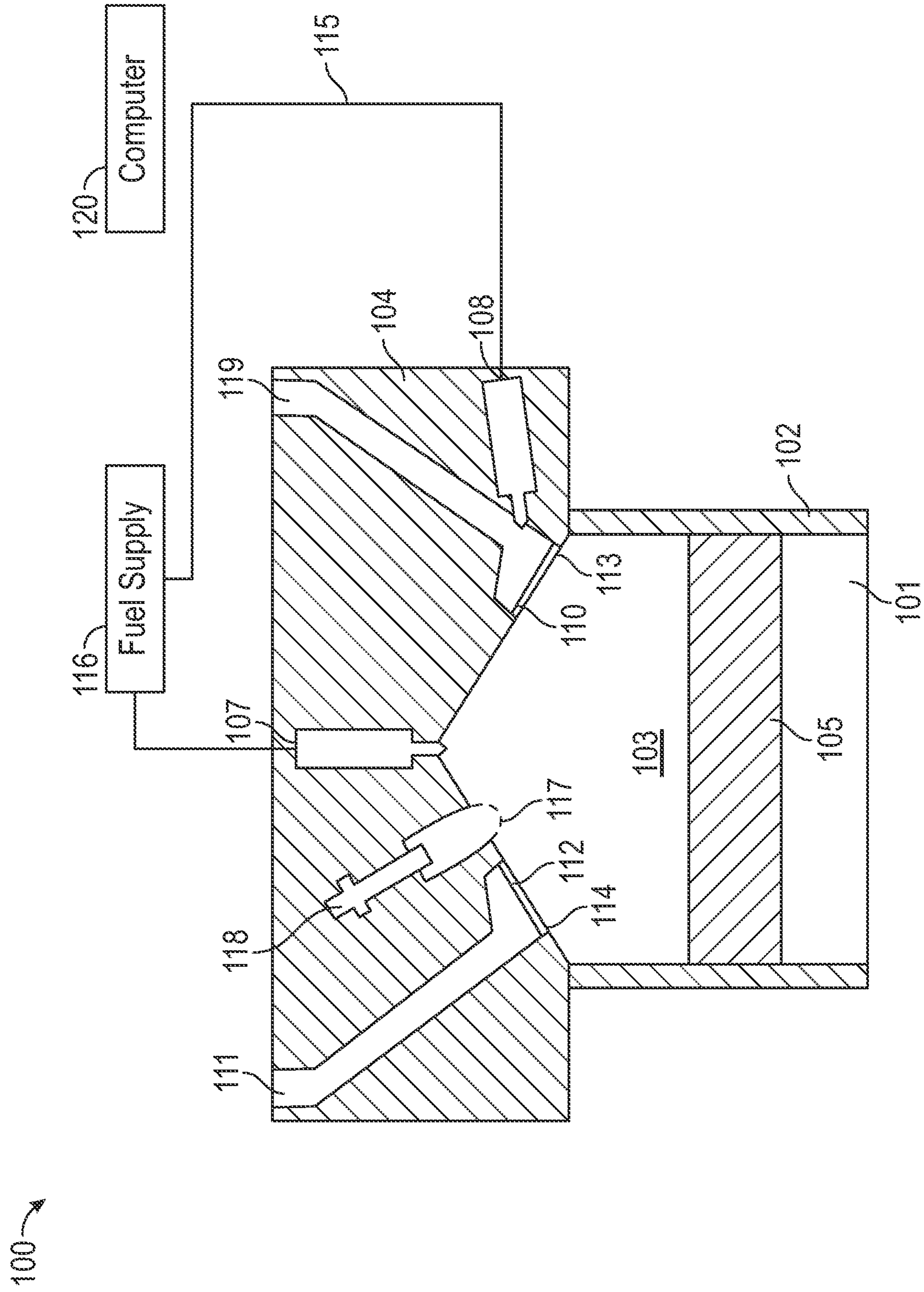
FIG. 1 shows a combustion system in accordance with one or more embodiments.

Referring to FIG. 1, a combustion system 100 in accordance with embodiments disclosed herein is illustrated. The combustion system 100 may be an internal combustion engine including at least one cylinder 101 formed within an engine body or engine block 102. In FIG. 1, only a portion of the engine block is shown, and only one cylinder in the engine block is shown, although an engine block may have several cylinders. The cylinder 101 may include a main chamber 103. The main chamber 103 may be a combustion chamber of the combustion system 100. Additionally, a cylinder head 104 may be mounted at a top of the cylinder 101 and forms an upper end of the main chamber 103. A piston 105 may be arranged inside the cylinder 101 and forms a lower end of the main chamber 103. The piston 105 moves up and down inside the cylinder 101 during an engine cycle, and the volume of the main chamber 103 changes with the position of the piston 105. Further, the piston 105 may be connected to a crankshaft (not shown) by a connecting rod. The crankshaft may convert the reciprocating motion of the piston 105 into rotary motion, as is well known in the art.

A prechamber 117 may be positioned in fluid communication with the main chamber 103. The prechamber 117, in accordance with one or more embodiments, may have a much smaller volume than the main chamber 103. For example, in one or more embodiments, the prechamber 117 may have a volume between 0.5 cubic centimeters and 3 cubic centimeters, while the main chamber 103 may have a displacement volume greater than 300 cubic centimeters.

The prechamber 117 may have one or more nozzles integrally formed through a wall of the prechamber 117, such that the one or more nozzles provide for fluid communication between the prechamber 117 and the main chamber 103. In some embodiments, the nozzles may be formed of nozzle inserts that extend through the prechamber wall to provide fluid communication between the prechamber 117 and the main chamber 103. The one or more nozzles are configured to accelerate fuel as it passes from the main chamber 103 to the prechamber 117 due to piston compression during compression strokes, which may improve vaporization and mixing of the fuel. A spark plug 118 may be connected to and configured to interface with the prechamber 117. The spark plug 118 may be used to ignite fuel within the prechamber 117 before the partial or complete combustion mixture may be jetted through the one or more nozzles and into the main chamber 103.

A fuel injector 107 according to embodiments of the present disclosure may be mounted in the cylinder head 104. A clamp (not pictured) may removably fix the fuel injector 107 to the cylinder head 104. The clamp may be disposed on a top of the fuel injector 107 and be attached to the cylinder head 104 to maintain a position of the fuel injector 107. The fuel injector 107 may be aligned and coaxial or angled with respect to a cylinder axis of the cylinder head 104. In one example, installation of the fuel injector 107 to the cylinder head 104 includes forming one or more spray nozzle assemblies. In some embodiments, a nozzle assembly may include a fuel channel, a premixing tube, and a port formed inside a tip of the fuel injector 107. The fuel injector 107 may be in fluid communication with the main chamber 103, such that the one or more spray nozzle assemblies may be in a position where an orifice of the spray nozzle assembly is in fluid communication to the main chamber 103.

In one or more embodiments, the one or more spray nozzle assemblies may have a wide spray angle. A first of the one or more spray nozzle assemblies may be directed towards and aligned with one of the nozzles of the prechamber 117. This first spray nozzle assembly may be configured to passively fuel the prechamber 117 while actively fueling the main chamber 103.

Still referring to FIG. 1, the cylinder head 104 may optionally include a second fuel injector 108 used in combination with the fuel injector 107. As shown, the cylinder head 104 may include at least one intake passage 119 terminating in a second intake port 110. A second fuel injector 108 may be positioned along the intake passage 119 in a configuration allowing injection of fuel into the intake passage 119. The second fuel injector 108 may be a similar fuel injector as the fuel injector 107. Additionally, an intake port 110 may include an intake valve 113 to control opening and closing of the intake port 110. Air flowing through the intake passage 119 to the main chamber 103 may be entrained in the fuel spray plume of the second fuel injector 108 when the second fuel injector 108 is injecting fuel. Although not shown, the main chamber 103 and the intake passage 119 may be connected to a source of air in a conventional manner. The air in the main chamber 103 and the intake passage 119 may be ambient air or a mixture of ambient air and recirculated exhaust gases.

The cylinder head 104 may also include at least one exhaust passage 111 having in an exhaust port 112. An exhaust valve 114 may be arranged to control opening and closing of the exhaust port 112. When the exhaust port 112 is open, exhaust gases can be pushed out of the main chamber 103 into the exhaust passage 111. An intake passage 119, an exhaust passage 111 and associated components (e.g., valves 113, 114 and fuel injectors 107, 108) may be provided in the cylinder head 104 for each cylinder in the combustion system 100, such as in the arrangement shown in FIG. 1 for the cylinder 101.

In one or more embodiments, the fuel injector(s) 107, 108 may be used to directly inject fuel into the main chamber 103 and/or intake passage 119. The fuel injector(s) 107, 108 may be fluidly connected to a fuel line 115, which is in communication with a fuel supply 116.

In one or more embodiments, a computer 120 may include a control system, such as an engine control unit, which may control an opening and closing of the fuel injector(s) 107, 108 to deliver the fuel into the main chamber 103 at desired times during an engine cycle. The control system may also control opening and closing of the intake and exhaust valves 113, 114. In one or more embodiments, the computer 120 may include a processor and a user interface panel at which a user may provide an input, such as a command, to the computer 120.

In some embodiments, a cable (not shown), such as an electrical or hydraulic power cable, may be coupled to the fuel injector(s) 107, 108. The cable may provide power to the fuel injector(s) 107, 108 from a power source (not shown). Additionally, the cable may be connected to the computer 120 to control the fuel injector(s) 107, 108. The computer 120 may include instructions or commands to operate the fuel injector(s) 107, 108 automatically or a user may manually control the computer 120 at a user interface panel (not shown). It is further envisioned that the computer 120 may be connected to an office via a satellite such that a user may remotely monitor conditions and send commands to the fuel injector(s) 107, 108. If leaks and performance issues are found, an alert may be sent to the control system to adjust or turn off the fuel injector(s) 107, 108 manually or automatically.

In one or more embodiments, the combustion system 100 may be used to perform turbulent jet-controlled compression ignition (TJCCI). TJCCI may involve passively fueling the prechamber 117 and igniting the fuel within the prechamber 117. In one or more embodiments, as discussed above, the prechamber 117 may be passively fueled via precise alignment of one of the spray nozzle assemblies of a fuel injector with a prechamber nozzle. In other embodiments, the prechamber 117 may be passively fueled via rebounding fuel jets, which may be initially produced by the fuel injector 107 and may rebound from the piston 105 or other main chamber internal surface in order to enter the prechamber 117 via the one or more nozzles. TJCCI may also performed via active fueling of the prechamber using a third fuel injector (not pictured) disposed within the prechamber 117. According to embodiments of the present disclosure, TJCCI may be characterized by the jetting of turbulent mixture into the main chamber 103, causing the temperature and pressure increase of the air fuel mixture to compression ignite (or auto-ignite), and an associated engine operating map, which will be discussed with respect with respect to FIGS. 4-7. Further, TJCCI is also characterized by specific timing charts, embodiments of which will also be discussed with respect to FIGS. 4-7. Accordingly, the prechamber 117 may be fueled either actively or passively, in any manner or configuration, without departing from the scope of this disclosure. In the same manner, TJCCI may be performed according to the methods described herein in combination with any prechamber fueling strategy without departing from the scope of this disclosure.

Figure 2:
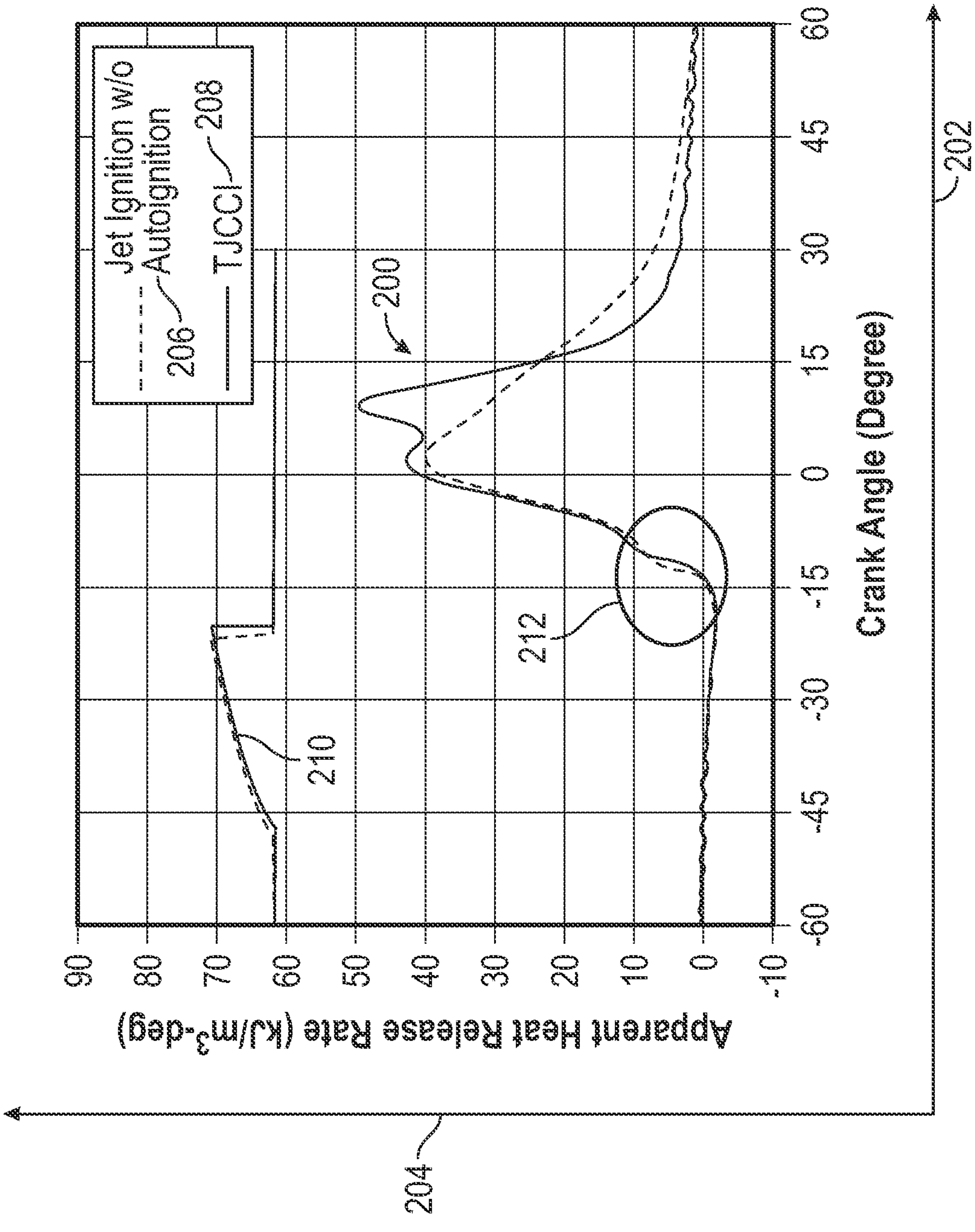
FIG. 2 shows an apparent heat release rate profile in accordance with one or more embodiments.

Turning now to FIG. 2, FIG. 2 shows an apparent heat release rate profile 200 in accordance with one or more embodiments and a corresponding spark timing profile 210 from the spark plug. In one or more embodiments, the apparent heat release rate profile 200 may represent engine crank angle on the horizontal axis 202 and apparent heat release rate on the vertical axis 204. The apparent heat release rate profile contrasts apparent heat release rate for jet ignition without autoignition (a simple jet ignition process), represented by dashed line 206, and the apparent heat release rate for TJCCI, represented by solid line 208.

In contrast to a simple jet ignition process that may use a spark with any prechamber, a TJCCI process may use a jet ignition to control compression ignition in the main chamber. A benefit of performing TJCCI may be a slower initial heat release rate in comparison to that produced in an autoignition process of an entire premixed mixture in the main chamber, such as homogeneous charge compression ignition or premixed gasoline compression ignition. This may be shown, for example, in circled area 212. A slower initial heat release rate may reduce a pressure rise rate of the combustion process, which may induce reduced combustion noise of the engine. Additionally, during the simple jet ignition process, the combustion heat release slows down after the first peak which is not optimal for complete combustion and piston work extraction. On the other hand, TJCCI may induce a second heat release peak which accelerates the combustion of the remaining fuel-air mixture and improves combustion and thermal efficiency.

Further, the start of combustion for TJCCI may be controlled by the spark plug 118 rather than a kinetic reaction, which may be heavily dependent on the thermal boundary condition of the engine. Combustion via a spark plug 118 may be more robustly controlled under different transient operating conditions.

Figure 3:
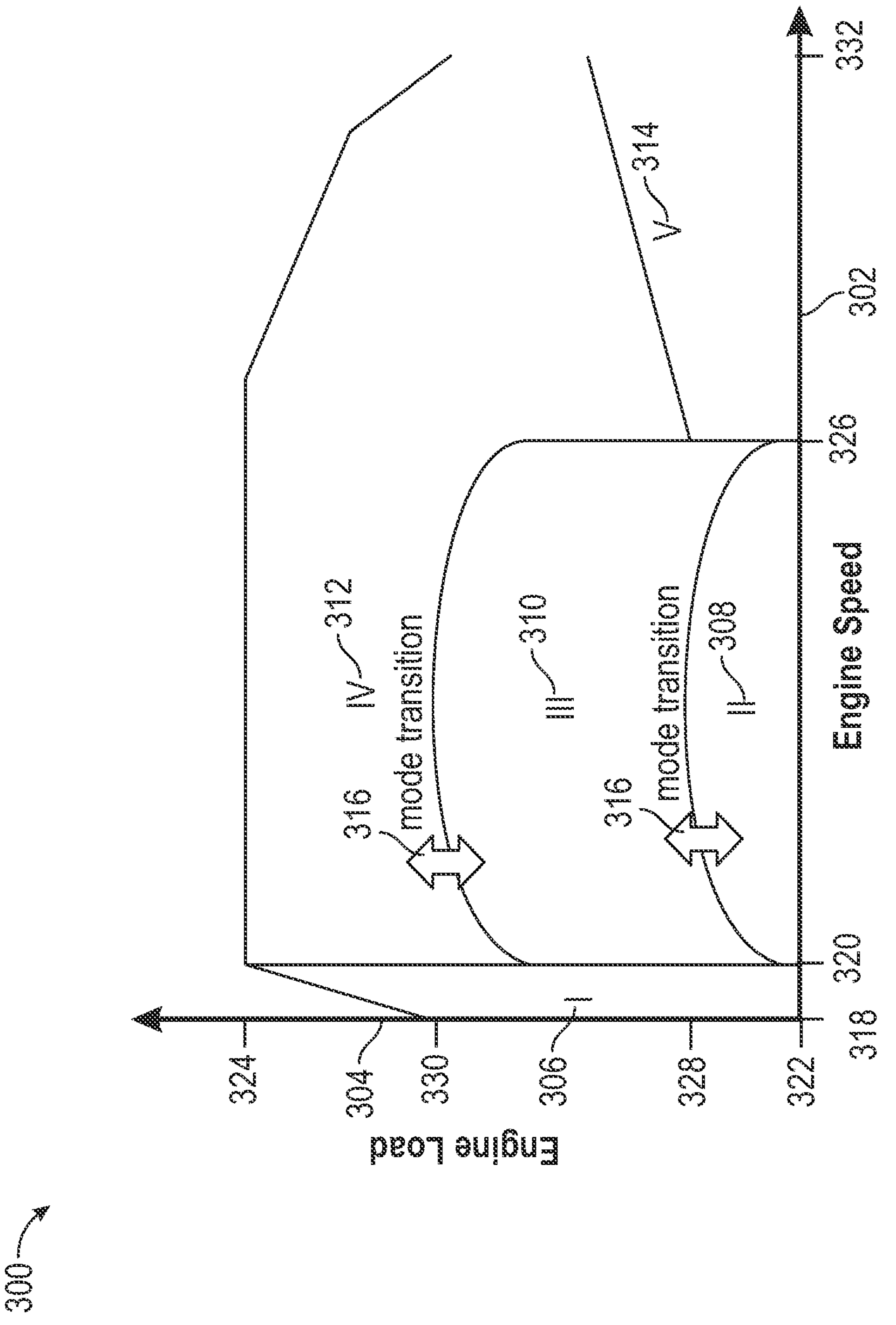
FIG. 3 shows an engine operating map in accordance with one or more embodiments.

FIG. 3 shows an engine operating map in accordance with one or more embodiments. The TJCCI concept may be visually represented in the form of the engine operating map 300. In one or more embodiments, the engine operating map 300 may have engine load represented on a vertical axis 304 and engine speed represented on a horizontal axis 302.

The operating map 300 may have five distinct engine operating map regions. Each distinct engine operating map region are subject to four different combustion strategies. The first engine operating map region 306 may have engine parameters characterized by low engine speed and an engine load ranging from a low engine load to a medium engine load. More specifically, the first set of engine parameters may include an engine speed ranging from a first minimum speed 318 to a first maximum speed 320 and an engine load ranging from a first minimum load 322 to a first maximum load 324. For example, in some embodiments, the first set of engine parameters may include an engine speed ranging from 200 to 1500 rpm and an engine load ranging from 0 bar BMEP (Brake mean effective pressure) to 15 bar.

The second engine operating map region 308 may have engine parameters characterized by low engine load and engine speed ranging from a low engine speed to a medium engine speed. More specifically, the second set of engine parameters may include an engine speed ranging from greater than the first maximum speed 320 to a second maximum speed 326 and an engine load ranging from the first minimum load 322 to a second maximum load 328. The second maximum load 328 may be less than the first maximum load 324. For example, in some embodiments, the second set of engine parameters may include an engine speed ranging from 700 to 4,500 rpm and an engine load ranging from 0 bar to 5 bar.

While in the first and second engine operating map regions 306, 308, the engine may perform passive jet ignition combustion with a stoichiometric mixture and a small volume of residual gas, which may be represented by the following equation:

$$\frac{x \text{ amount of air}}{x \text{ amount of fuel}} + y \text{ amount of residual gas.}$$

In one or more embodiments, a stoichiometric mixture may refer to a fuel mixture with an ideal 1:1 ratio of air to fuel. The residual gas may be introduced with the air flow but considered as an addition to the stoichiometric mixture as the residual gas may have little if any oxygen content. Having a small volume of residual gas may ensure that the exhaust temperature is high enough for the exhaust after-treatment, while maintaining robust combustion.

The third engine operating map region 310 may have engine parameters characterized by medium engine speed and medium engine load. In one or more embodiments, under the third set of engine parameters, the engine speed ranges from the first maximum speed 320 to the second maximum speed 326 and the engine load ranges from the second maximum load 328 to a third maximum load 330. The third maximum load 330 may be less than the first maximum load 324. For example, in some embodiments, the third set of engine parameters may include an engine speed ranging from 700 to 4,500 rpm and an engine load ranging from 3 to 12 bar. While in the third engine operating map region 310, the engine may perform TJCCI with an ultra-lean mixture and a small volume of cooled exhaust gas residual (EGR). An ultra-lean fuel mixture, in accordance with one or more embodiments, may refer to a fuel mixture with a high ratio of air to fuel. For example, an ultra-lean mixture may include an amount of air that is about 1.5-2.5 times greater than the amount of stoichiometric fuel. Such a fluid mixture may lead to high engine efficiency, high fuel efficiency, and low nitrogen oxide emissions. In particular, the nitrogen oxide emissions may be lower in comparison to spark or plasma assisted compression ignition concepts due to improved fuel mixing near the spark plug 118 gap. In one or more embodiments, an engine may be heavily operated within the third engine operating map region 310 in a typical vehicle driving cycle.

The fourth engine operating map region 312 may have engine parameters characterized by engine speed and engine load which both range from medium to high. Under the fourth set of engine parameters, the engine speed may range from greater than the first maximum speed 320 to a fourth maximum speed 332 (where the fourth maximum speed 332 may be greater than the second maximum speed 326) and the engine load may range, in general, from greater than the third maximum load 330 to the first maximum load 324. However, it should be noted that engine load across the fourth region 316 does not fall within a steady range and may vary depending on engine speed. For example, at speeds greater than the second maximum speed 326, the engine load may vary between the second maximum load 328 and the first maximum load 324. For example, in some embodiments, the fourth set of engine parameters may include an engine speed ranging from 700 to 6,500 rpm and an engine load ranging from 10 to 25 bar.

While in the fourth engine operating map region 312, the engine may perform passive jet ignition combustion with a stoichiometric mixture and a medium volume of cooled EGR. TJCCI may not be applied at high engine loads due to high intake boost requirement, high pressure rise rate, and high peak combustion pressure. Further, TJCCI may not be applied at high engine speeds due to long ignition delay times relative to high engine speed. In contrast, passive jet ignition performed with a stoichiometric mixture and a medium volume of cooled EGR may improve knock compared to spark ignition under similar mixture conditions, given rapid consumption of end gas.

The fifth engine operating map 314 may have engine parameters characterized by engine shut off. For example, in some embodiments, a fifth set of engine parameters may include an engine speed ranging from 4,000 to 6,500 rpm and an engine load ranging from Oto 10 bar.

A mode transition region 316 may be positioned between the second and third engine operating regions 308, 310 and between the third and fourth engine operating regions 310, 312. While in the mode transition region 316, the engine may perform passive jet ignition with a stoichiometric mixture and a small volume of residual gas, which may be controlled by different ignition timings chosen to meet different engine load targets.

In one or more embodiments, the mode transition region 316 may represent a change in combustion strategy, specifically a transition from a stoichiometric mixture to a lean mixture (i.e., between the second and third engine operating map regions 308, 310) or from a lean mixture to a stoichiometric mixture (i.e., between the third and fourth operating map regions 310, 312). In one or more embodiments, the transition may be managed by running the engine with a stoichiometric mixture and altering the fuel injection quantity and spark timing cycle by cycle to lower the work output of the crank shaft. Since stoichiometric combustion is very robust, the transition may become more stable. However, during the mode transition region 316, engine efficiency may reduce due to the late combustion phasing required to lower work output.

In one or more embodiments, the computer 120 may be programmed according to the engine operating map 300. For example, the engine operating map 300 may be run in the computer 120 (often referred to as the engine control unit (ECU), which may have all the necessary engine control parameters that have already been calibrated for the entire engine operating map 300. The software running in the computer 120 may be specifically written by an original engine manufacturer (OEM) to perform with the specific engine being used.

Figure 4:
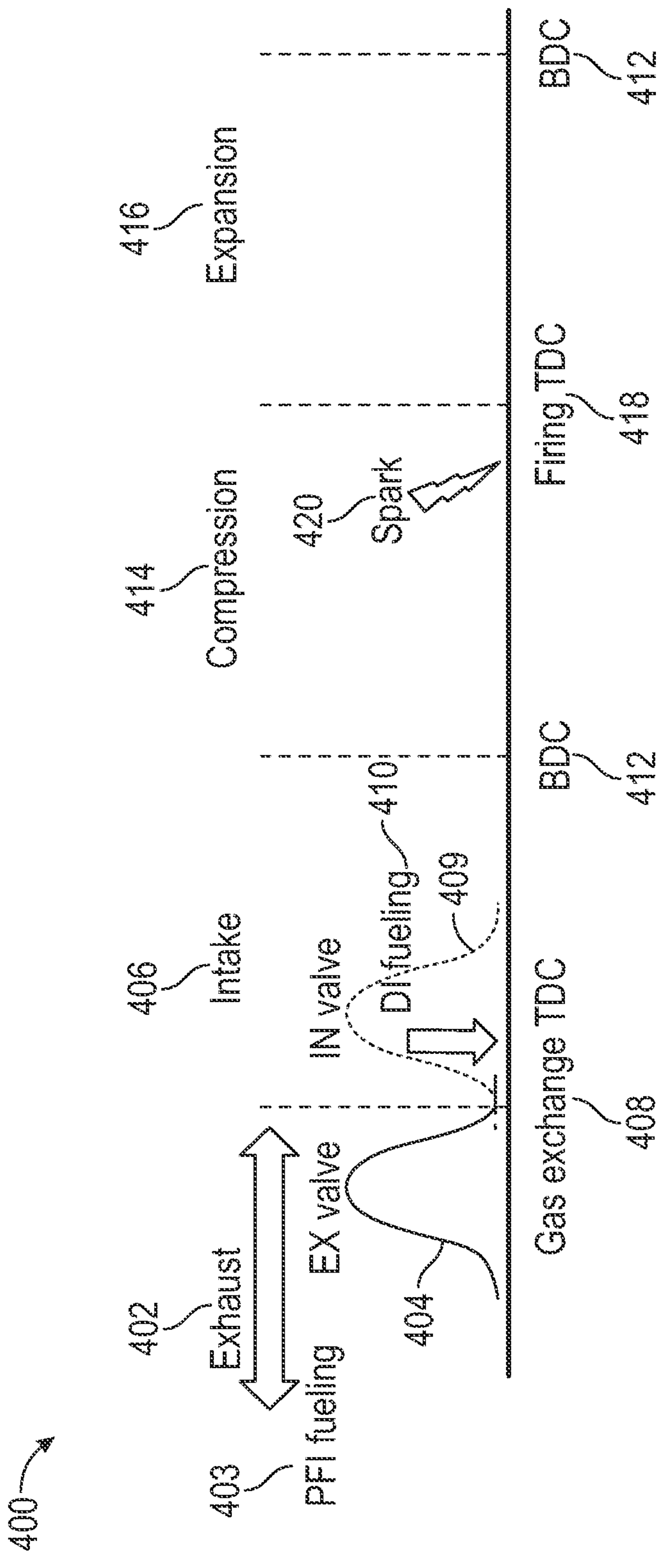
FIG. 4 shows an engine timing chart in accordance with one or more embodiments.

Turning now to FIG. 4, FIG. 4 shows an engine timing chart 400 for an engine operating in the first and second operating map regions 306, 308 in accordance with one or more embodiments. An engine timing chart, such as engine timing chart 400, may represent the four strokes of the engine (exhaust, intake, compression, and expansion) and the respective timing of actuation of the exhaust and intake valves, the timing of fuel injection, and the timing of the spark. Referring back to FIG. 1, in one or more embodiments, each cycle of the engine may correspond to two revolutions (four strokes) of the piston 105 within the cylinder 101.

Referring to FIGS. 1 and 4, during the exhaust stroke 402 of the engine, a port fuel injection procedure may be performed. In one or more embodiments, the port fuel injection procedure, visually shown in region 403, may be performed by the second fuel injector 108 depicted in FIG. 1. Additionally, during the exhaust stroke, the exhaust valve 114 may be actuated, visually depicted by curve 404. Between the exhaust stroke 402 and the intake stroke 406, the piston 105 may reach its first top dead center position, which may be referred to as the gas exchange top dead center 408.

Shortly after the gas exchange top dead center 408 and during the intake stroke 406, the intake valve 113 may be actuated, visually depicted by curve 409. Further, a direct injection fueling procedure 410 may be performed using the first fuel injector 107 immediately after the piston 105 reached the gas exchange top dead center 408. In one or more embodiments, the first fuel injector 107 may passively fuel the prechamber 117 and actively fuel the main chamber 103.

The piston 105 may reach a bottom dead center position 412 between the intake stroke 406 and the compression stroke 414 and between the expansion stroke 416 and the exhaust stroke 402. The piston 105 may reach a second top dead center position, which may be referred to as the firing top dead center 418, between the compression stroke 414 and the expansion stroke 416. The spark plug 118 may produce a spark 420 to ignite the fuel within the prechamber 117 during the compression stroke 414 prior to the piston 105 reaching the firing top dead center 418.

Figure 5:
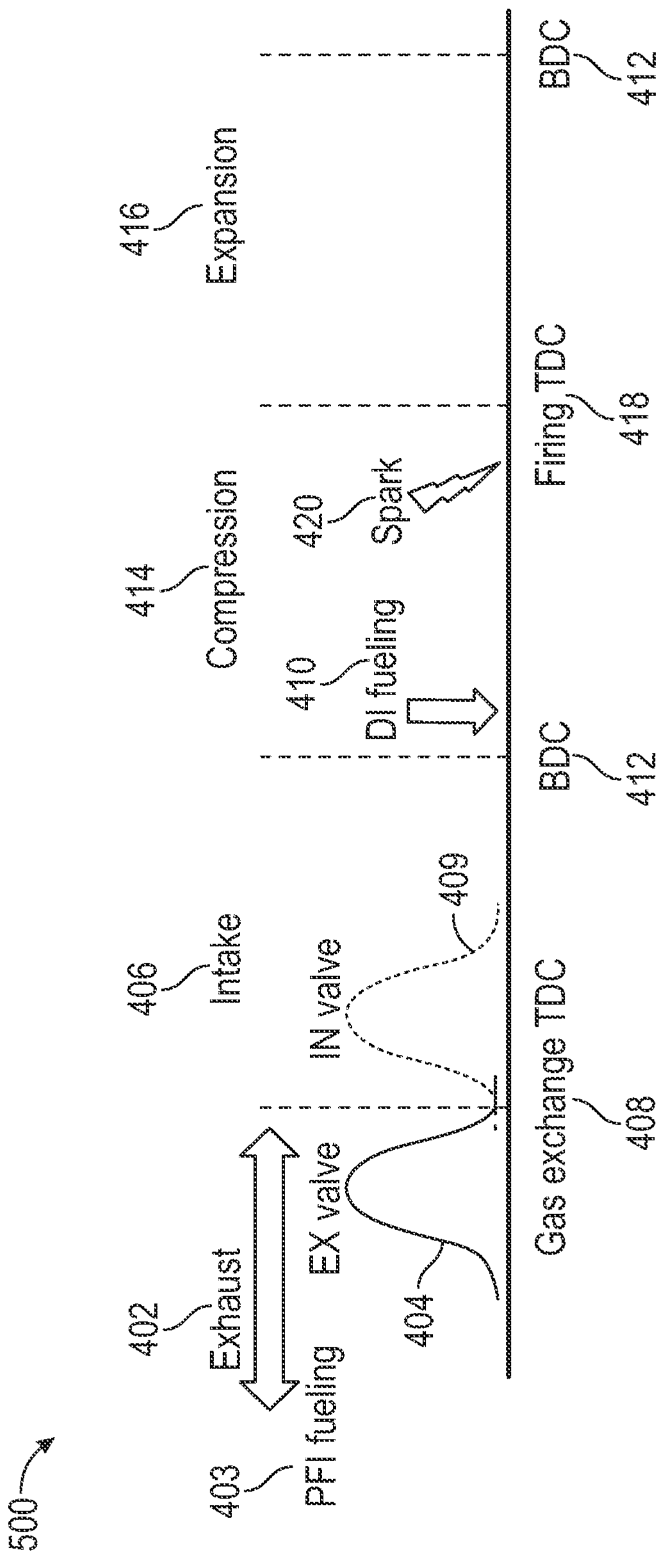
FIG. 5 shows an engine timing chart in accordance with one or more embodiments.

Referring now to FIGS. 1 and 5, FIG. 5 shows an engine timing chart 500 for an engine operating in the third operating map region 310 in accordance with one or more embodiments. During the exhaust stroke 402 of the engine, a port fuel injection procedure may be performed. In one or more embodiments, the port fuel injection procedure, visually shown in region 403, may be performed by the second fuel injector 108 depicted in FIG. 1. Additionally, during the exhaust stroke, the exhaust valve 114 may be actuated, visually depicted by curve 404. Shortly after the gas exchange top dead center 408 and during the intake stroke 406, the intake valve 113 may be actuated, visually depicted by curve 409. In other words, the intake valve 113 may be actuated at the beginning of the intake stroke 406.

A direct injection fueling procedure 410 may be performed using the first fuel injector 107 in the compression stroke 414 after the piston has passed the bottom dead center 412 position. In one or more embodiments, the first fuel injector 107 may passively fuel the prechamber 117 and actively fuel the main chamber 103. The spark plug 118 may produce a spark 420 to ignite the fuel within the prechamber 117 during the compression stroke 414 prior to the piston 105 reaching the firing top dead center 418.

Figure 6:
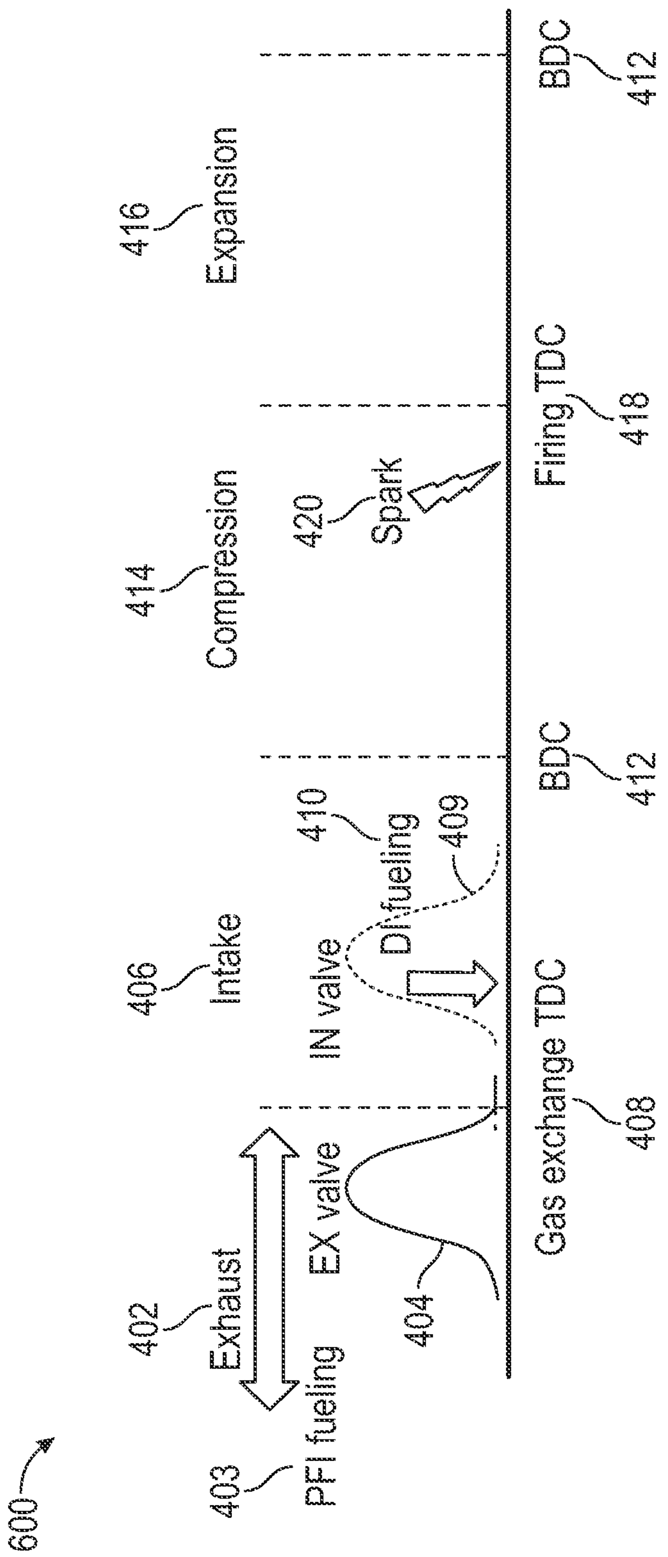
FIG. 6 shows an engine timing chart in accordance with one or more embodiments.

Referring now to FIGS. 1 and 6, FIG. 6 shows an engine timing chart 600 for an engine operating in the fourth operating map region 312 in accordance with one or more embodiments. During the exhaust stroke 402 of the engine, a port fuel injection procedure may be performed. In one or more embodiments, the port fuel injection procedure, visually shown in region 403, may be performed by the second fuel injector 108 depicted in FIG. 1. Additionally, during the exhaust stroke, the exhaust valve 114 may be actuated, visually depicted by curve 404. In the middle of the intake stroke 406, the intake valve 113 may be actuated, visually depicted by curve 409.

A direct injection fueling procedure 410 may be performed using the first fuel injector 107 in the middle of the intake stroke 406, during actuation of the intake valve 113. In one or more embodiments, the first fuel injector 107 may passively fuel the prechamber 117 and actively fuel the main chamber 103. The spark plug 118 may produce a spark 420 to ignite the fuel within the prechamber 117 during the compression stroke 414 prior to the piston 105 reaching the firing top dead center 418.

Figure 7:
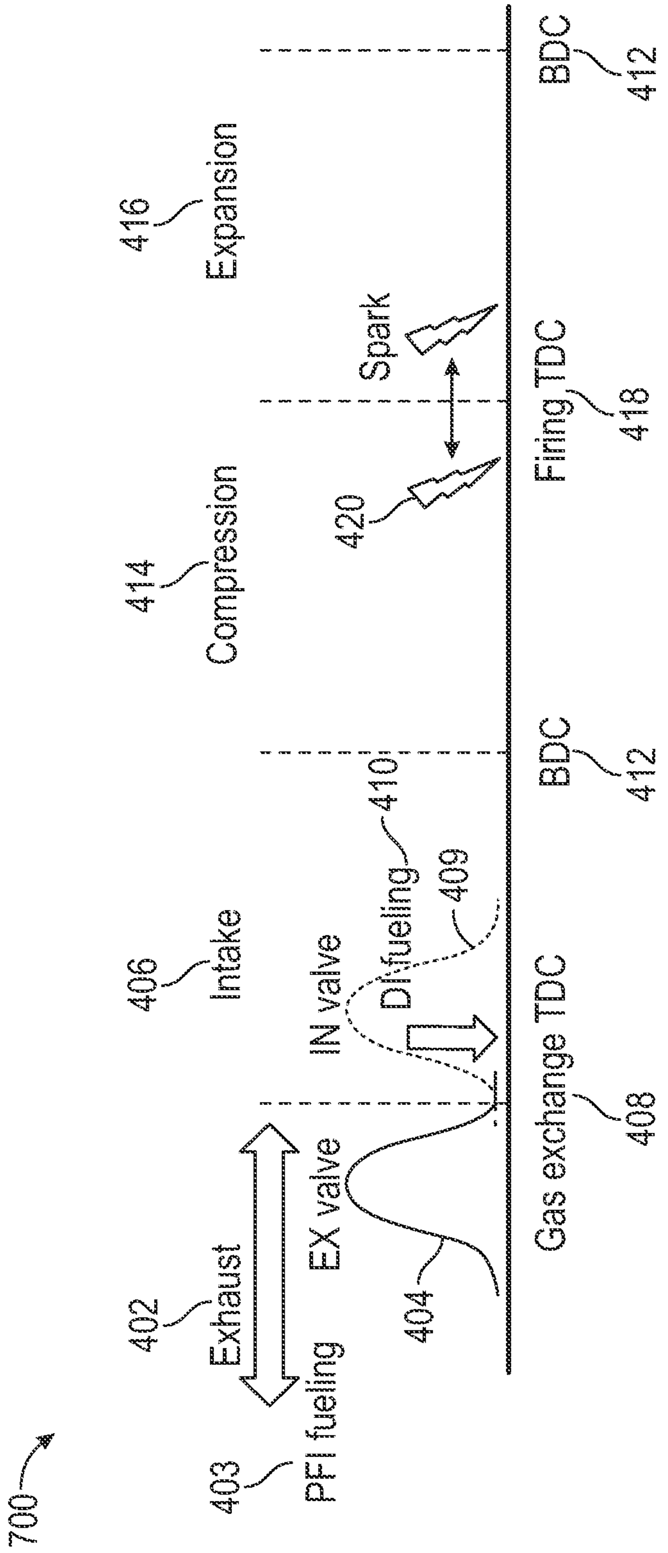
FIG. 7 shows an engine timing chart in accordance with one or more embodiments.

Turning now to FIG. 7, FIG. 7 shows an engine timing chart 700 for an engine operating in the transition mode region 316 in accordance with one or more embodiments. Referring to FIGS. 1 and 7, during the exhaust stroke 402 of the engine, a port fuel injection procedure may be performed. In one or more embodiments, the port fuel injection procedure, visually shown in region 403, may be performed by the second fuel injector 108 depicted in FIG. 1. Additionally, during the exhaust stroke, the exhaust valve 114 may be actuated, visually depicted by curve 404.

Shortly after the gas exchange top dead center 408 and during the intake stroke 406, the intake valve 113 may be actuated, visually depicted by curve 409. Further, a direct injection fueling procedure 410 may be performed using the first fuel injector 107 immediately after the piston 105 reached the gas exchange top dead center 408. In one or more embodiments, the first fuel injector 107 may passively fuel the prechamber 117 and actively fuel the main chamber 103.

The spark plug 118 may produce a spark 420 to ignite the fuel within the prechamber 117 at a selected time during the engine cycle between the compression stroke 414 prior to the piston 105 reaching the firing top dead center 418 and the expansion stroke 416 after the piston 105 passes the firing top dead center 418. The spark timing may be selected based on different engine operation needs.

Figure 8:
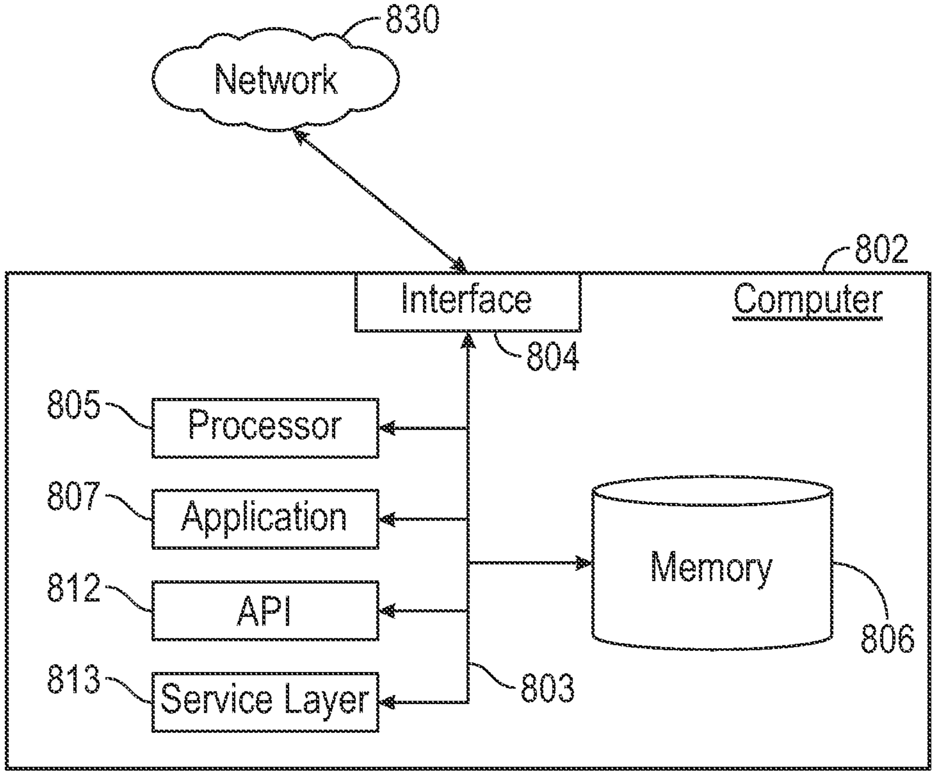
FIG. 8 shows a computer system in accordance with one or more embodiments.

FIG. 8 depicts a block diagram of a computer system 802 used to provide computational functionalities associated with described algorithms, methods, functions, processes, flows, and procedures as described in this disclosure, according to one or more embodiments. The illustrated computer 802 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 802 may include a computer that includes an input device, such as a keypad, keyboard, touch screen, or other device that can accept user information, and an output device that conveys information associated with the operation of the computer 802, including digital data, visual, or audio information (or a combination of information), or a GUI.

The computer 802 can serve in a role as a client, network component, a server, a database or other persistency, or any other component (or a combination of roles) of a computer system for performing the subject matter described in the instant disclosure. The illustrated computer 802 is communicably coupled with a network 830. In some implementations, one or more components of the computer 802 may be configured to operate within environments, including cloud-computing-based, local, global, or other environment (or a combination of environments).

At a high level, the computer 802 is an electronic computing device operable to receive, transmit, process, store, or manage data and information associated with the described subject matter. According to some implementations, the computer 802 may also include or be communicably coupled with an application server, e-mail server, web server, caching server, streaming data server, business intelligence (BI) server, or other server (or a combination of servers).

The computer 802 can receive requests over network 830 from a client application (for example, executing on another computer 802) and responding to the received requests by processing the said requests in an appropriate software application. In addition, requests may also be sent to the computer 802 from internal users (for example, from a command console or by other appropriate access method), external or third-parties, other automated applications, as well as any other appropriate entities, individuals, systems, or computers.

Each of the components of the computer 802 can communicate using a system bus 803. In some implementations, any or all of the components of the computer 802, both hardware or software (or a combination of hardware and software), may interface with each other or the interface 804 (or a combination of both) over the system bus 803 using an application programming interface (API) 812 or a service layer 813 (or a combination of the API 812 and service layer 813. The API 812 may include specifications for routines, data structures, and object classes. The API 812 may be either computer-language independent or dependent and refer to a complete interface, a single function, or even a set of APIs. The service layer 813 provides software services to the computer 802 or other components (whether or not illustrated) that are communicably coupled to the computer 802. The functionality of the computer 802 may be accessible for all service consumers using this service layer. Software services, such as those provided by the service layer 813, provide reusable, defined business functionalities through a defined interface. For example, the interface may be software written in JAVA, C++, or other suitable language providing data in extensible markup language (XML) format or another suitable format. While illustrated as an integrated component of the computer 802, alternative implementations may illustrate the API 812 or the service layer 813 as stand-alone components in relation to other components of the computer 802 or other components (whether or not illustrated) that are communicably coupled to the computer 802. Moreover, any or all parts of the API 812 or the service layer 813 may be implemented as child or sub-modules of another software module, enterprise application, or hardware module without departing from the scope of this disclosure.

The computer 802 includes an interface 804. Although illustrated as a single interface 804 in FIG. 8, two or more interfaces 804 may be used according to particular needs, desires, or particular implementations of the computer 802. The interface 804 is used by the computer 802 for communicating with other systems in a distributed environment that are connected to the network 830. Generally, the interface 804 includes logic encoded in software or hardware (or a combination of software and hardware) and operable to communicate with the network 830. More specifically, the interface 804 may include software supporting one or more communication protocols associated with communications such that the network 830 or interface's hardware is operable to communicate physical signals within and outside of the illustrated computer 802.

The computer 802 includes at least one computer processor 805. Although illustrated as a single computer processor 805 in FIG. 8, two or more processors may be used according to particular needs, desires, or particular implementations of the computer 802. Generally, the computer processor 805 executes instructions and manipulates data to perform the operations of the computer 802 and any machine learning networks, algorithms, methods, functions, processes, flows, and procedures as described in the instant disclosure.

The computer 802 also includes a memory 806 that holds data for the computer 802 or other components (or a combination of both) that can be connected to the network 830. For example, memory 806 can be a database storing data consistent with this disclosure. Although illustrated as a single memory 806 in FIG. 8, two or more memories may be used according to particular needs, desires, or particular implementations of the computer 802 and the described functionality. While memory 806 is illustrated as an integral component of the computer 802, in alternative implementations, memory 806 can be external to the computer 802.

The application 807 is an algorithmic software engine providing functionality according to particular needs, desires, or particular implementations of the computer 802, particularly with respect to functionality described in this disclosure. For example, application 807 can serve as one or more components, modules, applications, etc. Further, although illustrated as a single application 807, the application 807 may be implemented as multiple applications 807 on the computer 802. In addition, although illustrated as integral to the computer 802, in alternative implementations, the application 807 can be external to the computer 802.

There may be any number of computers 802 associated with, or external to, a computer system containing a computer 802, wherein each computer 802 communicates over network 830. Further, the term “client,” “user,” and other appropriate terminology may be used interchangeably as appropriate without departing from the scope of this disclosure. Moreover, this disclosure contemplates that many users may use one computer 802, or that one user may use multiple computers 802.

Figure 9:
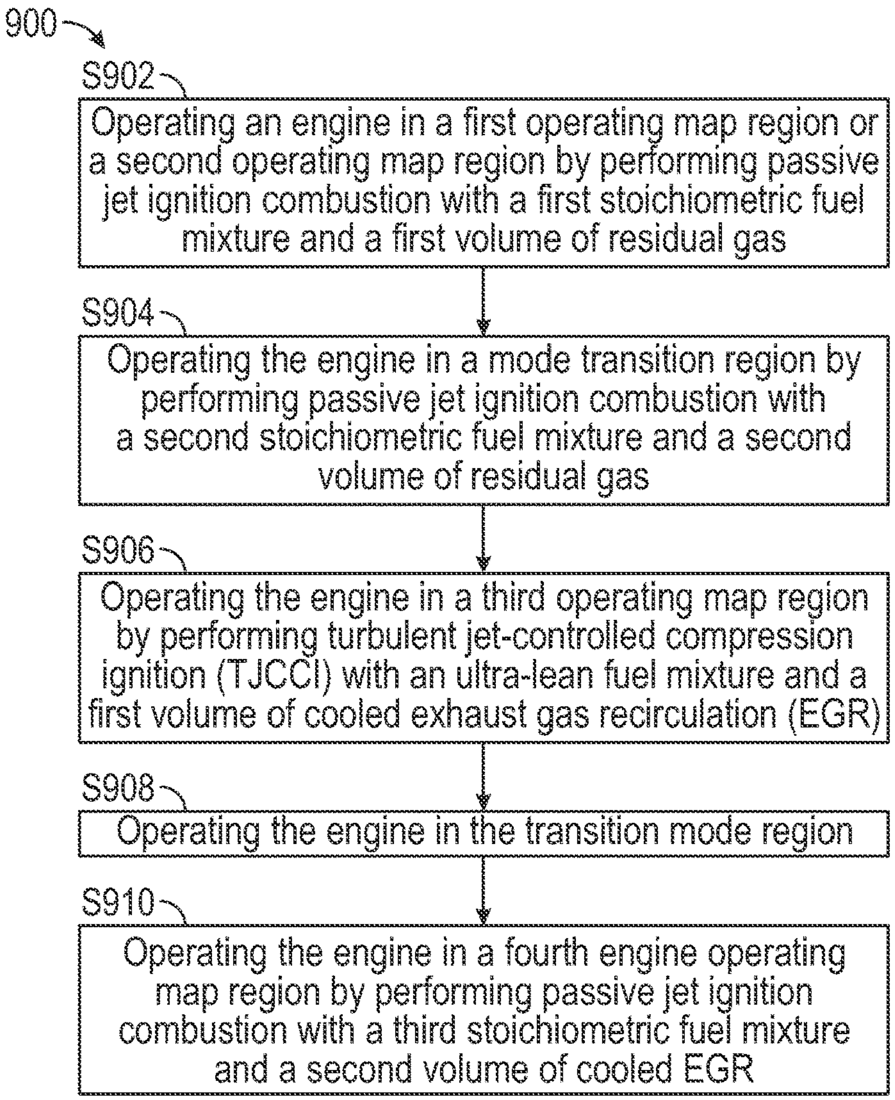
FIG. 9 shows a flowchart in accordance with one or more embodiments.

FIG. 9 depicts a flowchart in accordance with one or more embodiments. More specifically, FIG. 9 depicts a flowchart 900 of a method of operating an engine under various engine operating map regions. Further, one or more blocks in FIG. 9 may be performed by one or more components as described in FIGS. 1-8. While the various blocks in FIG. 9 are presented and described sequentially, one of ordinary skill in the art will appreciate that some or all of the blocks may be executed in different orders, may be combined, may be omitted, and some or all of the blocks may be executed in parallel. Furthermore, the blocks may be performed actively or passively.

Initially, an engine may be operated in a first operating map region 306 and a second operating map region 308 by performing passive jet ignition combustion with a first stoichiometric fuel mixture and a first volume of residual gas, S902. In one or more embodiments, operating the engine in the first and second operating map regions 306 may involve operating the engine according to engine timing chart 400. Specifically, during the exhaust stroke 402 of the engine, a port fuel injection procedure 403 may be performed and the exhaust valve 114 may be actuated. At the beginning of the intake stroke 406, the intake valve 113 may be actuated. Additionally, during the intake stroke 406, a direct injection procedure 410 may be performed immediately after the piston 105 has passed the gas exchange top dead center 408. During the compression stroke 414, a spark may be provided from the spark plug 118 prior to the piston reaching the firing top dead center 418.

Next, the engine may be operated in a mode transition region 316 by performing passive jet ignition combustion with a second stoichiometric fuel mixture and a second volume of residual gas, S904. In one or more embodiments, operating the engine in the mode transition region 316 may involve operating the engine according to engine timing chart 700. Specifically, during the exhaust stroke 402 of the engine, a port fuel injection procedure 403 may be performed and the exhaust valve 114 may be actuated. At the beginning of the intake stroke 406, the intake valve 113 may be actuated. Additionally, during the intake stroke 406, a direct injection procedure 410 may be performed immediately after the piston 105 has passed the gas exchange top dead center 408. A first spark may be produced from the spark plug 118 during the compression stroke 414 immediately prior to the firing top dead center 418. Alternatively, a spark may be produced from the spark plug 118 during the expansion stroke 416 immediately after the firing top dead center 418.

The engine may then be operated in a third operating map region 310 by performing turbulent jet-controlled compression ignition (TJCCI) with an ultra-lean fuel mixture and a first volume of cooled exhaust gas recirculation (EGR), S906. In one or more embodiments, operating the engine in a third operating map region 310 may involve operating the engine according to engine timing chart 500. Specifically, during the exhaust stroke 402 of the engine, a port fuel injection procedure 403 may be performed and the exhaust valve 114 may be actuated. At the beginning of the intake stroke 406, the intake valve 113 may be actuated. During the compression stroke 414, a direct injection procedure 410 may be performed after the piston 105 has passed the bottom dead center 412. Further, a spark may be produced from the spark plug 118 during the compression stroke 414 immediately prior to the piston 105 reaching the firing top dead center 418.

Following the third operating map region 310, the engine may then be operated once more in the transition mode region 316, S908. Similar to in step S904, the engine may operate according to engine timing chart 700.

The engine may further be operated in a fourth engine operating map region 312 by performing passive jet ignition combustion with a third stoichiometric fuel mixture and a second volume of cooled EGR, S910. In one or more embodiments, operating the engine in the fourth engine operating map region 312 may involve operating the engine according to engine timing chart 600. Specifically, during the exhaust stroke 402 of the engine, a port fuel injection procedure 403 may be performed and the exhaust valve 114 may be actuated. In the middle of the intake stroke 406, the intake valve 113 may be actuated. Additionally, during the intake stroke 406, a direct injection procedure 410 may be performed in the middle of the intake stroke 406, during actuation of the intake valve 113. Further, a spark may be produced from the spark plug 118 during the compression stroke 414 immediately prior to the piston 105 reaching the firing top dead center 418.

In one or more embodiments, moving from one engine operating map region to another may be controlled, at least in part, on a desired engine load and a desired engine speed provided to a computer system, such as the computer 120 and the computer 802, by a user.

In one or more embodiments, the second volume of cooled EGR, as required in the fourth operating map region 312, may be larger than the first volume of cooled EGR, as required in the third operating map region 310.

Figure 10:
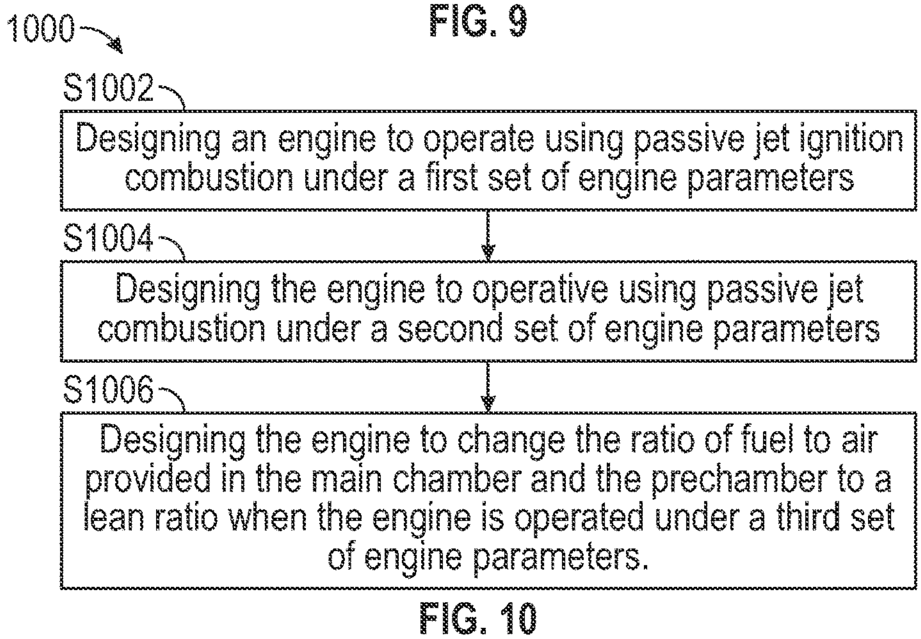
FIG. 10 shows a flowchart in accordance with one or more embodiments.

FIG. 10 depicts a flowchart in accordance with one or more embodiments. More specifically, FIG. 10 depicts a flowchart 1000 of a method of designing an engine to operate under different combustion strategies. Further, one or more blocks in FIG. 10 may be performed by one or more components as described in FIGS. 1-8. While the various blocks in FIG. 10 are presented and described sequentially, one of ordinary skill in the art will appreciate that some or all of the blocks may be executed in different orders, may be combined, may be omitted, and some or all of the blocks may be executed in parallel. Furthermore, the blocks may be performed actively or passively.

Initially, an engine may be designed to operate using passive jet ignition combustion under a first set of engine parameters, S1002. In one or more embodiments, the first set of engine parameters may correspond to the engine speeds and engine loads of the first engine operating map region 306. More specifically, the first set of engine parameters may include an engine speed ranging from a first minimum speed 318 to a first maximum speed 320 and an engine load ranging from a first minimum load 322 to a first maximum load 324. In one or more embodiments, the first minimum speed 318 and first minimum load 322 may be described as low engine speed and low engine load, respectively. Further, the first maximum speed 320 and the first maximum load 324 may be described as medium engine speed and medium engine load, respectively. Under the first set of engine parameters, a ratio of fuel to air provided in the main chamber 103 and the prechamber 117 after injection is a stoichiometric mixture.

In one or more embodiments, passive jet ignition combustion may include injecting fuel from the fuel injector 107 into the main chamber, where an amount of the fuel is directed into the prechamber 117 via one or more nozzles. Through this injection procedure, a prechamber fuel air mixture may be provided in the prechamber 117, and a main chamber fuel air mixture may be provided in the main chamber 103, where the prechamber 117 is adjacent to and in fluid communication with the main chamber 103. The passive jet ignition combustion may further include generating a spark in the prechamber 117 to ignite the prechamber fuel air mixture and ejecting the ignited prechamber fuel air mixture into the main chamber 103 to ignite the main chamber fuel air mixture.

The engine may also be designed to operate using passive jet ignition combustion under a second set of engine parameters, S1004. In one or more embodiments, the second set of engine parameters may correspond to the engine speeds and engine loads of the second engine operating map region 308. More specifically, the second set of engine parameters may include an engine speed ranging from greater than the first maximum speed 320 to a second maximum speed 326 and an engine load ranging from the first minimum load 322 to a second maximum load 328. In one or more embodiments, the second maximum speed 326 and the second maximum load 328 may be described as medium engine speed and medium engine load, respectively.

Additionally, the engine may be designed to change the ratio of fuel to air provided in the main chamber 103 and the prechamber 117 to an ultra-lean ratio when the engine is operated under a third set of engine parameters, S1006. In one or more embodiments, under the third set of engine parameters, the engine speed ranges from the first maximum speed 320 to the second maximum speed 326 and the engine load ranges from the second maximum load 328 to a third maximum load 330. Further, the ultra-lean ratio comprises more air than fuel.

The method depicted in flowchart 1000 may further include providing an engine operating map, such as engine operating map 300, defining multiple regions of engine operation. Each region of engine operation may define the ratio of fuel to air provided in the main chamber 103 and the prechamber 117 under different engine parameters.

In one or more embodiments, the multiple regions may include a first region 306, defining the stoichiometric ratio of fuel to air under the first set of engine parameters, and a second region 308, defining the stoichiometric ratio of fuel to air under the second set of engine parameters. The third region 310 may define the ultra-lean ratio of fuel to air under the third set of engine parameters. Under the third set of engine parameters, the engine speed may range from greater than the first maximum speed 320 to the second maximum speed 326 and the engine load may range from greater than the second maximum load 328 to a third maximum load 330. The fourth region 312 may define a stoichiometric ratio of fuel to air under a fourth set of engine parameters. Under the fourth set of engine parameters, the engine speed may range from greater than the first maximum speed 320 to a fourth maximum speed 332 and the engine load may range, in general, from greater than the third maximum load 330 to the first maximum load 324. However, it should be noted that engine load across the fourth region 316 does not fall within a steady range and may vary depending on engine speed. For example, at speeds greater than the second maximum speed 326, the engine load may vary between the second maximum load 328 and the first maximum load 324.

In one or more embodiments, the engine operating map 300 may further define the third region 310 as having a first amount of cooled EGR provided with the ultra-lean ratio of fuel to air. Further, the fourth region 312 may be defined as having a second amount of cooled EGR provided with the stoichiometric ratio of fuel to air. In one or more embodiments, the second amount of cooled EGR may be greater than the first amount of EGR. Additionally, operating the engine under the various different regions and corresponding timing parameters includes conducting fuel injection at different times as the piston 105 cycles through the main chamber 103.

Embodiments of the present disclosure may provide at least one of the following advantages. Turbulent jet-controlled compression ignition may assist in mixing and vaporizing fuel within the prechamber, prior to jetting into the main chamber. Allowing for passive fueling of the prechamber allows the maintaining of a small prechamber volume, since only a spark plug is required to be installed within the prechamber. In contrast, in embodiments of engines in which a fuel injector is installed within the prechamber necessarily requires that the prechamber be larger in volume, which may be undesirable. Further, direct prechamber fuel injection reduces the time and distance the fuel may have to vaporize properly. Embodiments of the present disclosure, which rely on passive prechamber fueling, allow for plenty of time and distance to promote adequate mixing and vaporization of fuel.

Implementation of TJCCI in place of spark assisted gasoline compression ignition allows for improved cycle-to-cycle repeatability of the local equivalence ratio of the stratified fuel air mixture in the spark gap. Addition of a prechamber nozzle through which fuel may be accelerated into the prechamber may create high velocity flow into the prechamber during the compression stroke, which promotes mixing within the mixture to produce a homogenous fuel mixture. Continuation of this process throughout the compression stroke allows for accumulation of fuel in the prechamber, creating the optimal equivalence ratio mixture within the prechamber for earlier fuel injection timing. A reduction in local equivalence ratio, which TJCCI promotes, ensures a robust and strong flame propagation within the prechamber, leading to reduced nitrogen oxide emissions.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method, comprising:
- operating an engine in a first engine operating map region and a second engine operating map region by performing passive jet ignition combustion with a first stoichiometric fuel mixture and a first volume of residual gas;
- operating the engine in a mode transition region by performing passive jet ignition combustion with a second stoichiometric fuel mixture and a second volume of residual gas,
- wherein the second volume of residual gas is controlled by an ignition timing chosen to meet a target engine load;
- operating the engine in a third engine operating map region by performing turbulent jet controlled compression ignition (TJCCI) with an ultra lean fuel mixture and a first volume of cooled exhaust gas recirculation;
- operating the engine in the mode transition region;
- operating the engine in a fourth engine operating map region by performing passive jet ignition combustion with a third stoichiometric fuel mixture and a second volume of cooled exhaust gas recirculation; and
- operating the engine in a fifth engine operating map region, wherein the fifth engine operating map region is characterized by shutting off the engine,
- wherein the engine has a cycle spanning two revolutions of a piston within the engine, and
- wherein the cycle comprises:
  - an exhaust stroke, an intake stroke, a compression stroke, and an expansion stroke;
  - a gas exchange top dead center piston position located between the exhaust stroke and the intake stroke;
  - a firing top dead center piston position located between the compression stroke and the expansion stroke; and
  - a bottom dead center piston position located between the intake stroke and the compression stroke and between the expansion stroke and the exhaust stroke.

2. The method of claim 1, wherein operating an engine in a first engine operating map region and a second engine operating map region comprises:
- during the exhaust stroke of the engine:
  - performing a port fuel injection procedure; and
  - actuating an exhaust valve;
- during the intake stroke of the engine:
  - actuating an intake valve at a beginning of the intake stroke; and
  - performing a direct injection fueling procedure after the gas exchange top dead center piston position; and
- during the compression stroke of the engine:
  - providing a spark from a spark plug immediately prior to the firing top dead center piston position.

3. The method of claim 1, wherein operating an engine in a third engine operating map comprises:
- during the exhaust stroke of the engine:
  - performing a port fuel injection procedure; and
  - actuating an exhaust valve;
- during the intake stroke of the engine:
  - actuating an intake valve; and
- during the compression stroke of the engine:
  - performing a direct injection fueling procedure at a beginning of the compression stroke; and
  - providing a spark from a spark plug immediately prior to the firing top dead center piston position.

4. The method of claim 1, wherein operating an engine in a fourth engine operating map comprises:
- during the exhaust stroke of the engine:
  - performing a port fuel injection procedure; and
  - actuating an exhaust valve;
- during the intake stroke of the engine:
  - actuating an intake valve at a middle of the intake stroke; and
  - performing a direct injection fueling procedure at the middle of the intake stroke; and
- during the compression stroke of the engine:
  - providing a spark from a spark plug immediately prior to the firing top dead center piston position.

5. The method of claim 1, wherein operating an engine in the mode transition region comprises:
- during the exhaust stroke of the engine:
  - performing a port fuel injection procedure; and
  - actuating an exhaust valve;
- during the intake stroke of the engine:
  - actuating an intake valve at a beginning of the intake stroke; and
  - performing a direct injection fueling procedure after the gas exchange top dead center piston position;
- during the compression stroke of the engine:
  - providing a first spark from a spark plug immediately prior to the firing top dead center piston position; and
- during the expansion stroke of the engine:
  - providing a second spark from the spark plug immediately after the firing top dead center piston position.

6. The method of claim 1 wherein the second volume of cooled exhaust gas recirculation is larger than the first volume of cooled exhaust gas recirculation.

7. The method of claim 1, further comprising moving from one engine operating map region to another engine operating map region based, at least in part, on a desired engine load and a desired engine speed provided to a computer processor by a user.

8. A turbulent jet controlled compression ignition (TJCCI) engine system, comprising:
- an engine block with a cylinder;
- a piston configured to move up and down inside a main chamber of the cylinder;
- a prechamber in fluid communication with the main chamber;
- a fuel injector mounted to the engine block and in fluid communication with the main chamber; and
- a computer system, having a memory and a processor, in communication with the piston, an exhaust valve, an intake valve, one or more fuel injectors, and a spark plug, wherein the spark plug is connected to the prechamber, where the processor is configured to:
  - operate an engine in a first engine operating map region and a second engine operating map region by performing passive jet ignition combustion with a first stoichiometric fuel mixture and a first volume of residual gas;
  - operate the engine in a mode transition region by performing passive jet ignition combustion with a second stoichiometric fuel mixture and a second volume of residual gas, wherein the second volume of residual gas is controlled by an ignition timing to meet a target engine load;

operate the engine in a third engine operating map region by performing turbulent jet controlled compression ignition (TJCCI) with an ultra lean fuel mixture and a first volume of cooled exhaust gas recirculation;

operate the engine in the mode transition region;

operate the engine in a fourth engine operating map region by performing passive jet ignition combustion with a third stoichiometric fuel mixture and a second volume of cooled exhaust gas recirculation; and operate the engine in a fifth engine operating map region, wherein the fifth engine operating map region is characterized by shutting off the engine.

9. The TJCCI engine system of claim 8, wherein the engine has a cycle spanning two revolutions of the piston within the engine, the cycle comprising:

an exhaust stroke, an intake stroke, a compression stroke, and an expansion stroke;

a gas exchange top dead center piston position located between the exhaust stroke and the intake stroke;

a firing top dead center piston position located between the compression stroke and the expansion stroke; and a bottom dead center piston position located between the intake stroke and the compression stroke and between the expansion stroke and the exhaust stroke.

10. The TJCCI engine system of claim 9, wherein when the engine operates in the first and second engine operating map regions, the computer system is further configured to:

during the exhaust stroke of the engine:

actuate a first of the one or more fuel injectors in a port of the engine positioned proximate the main chamber; and actuate the exhaust valve;

during the intake stroke of the engine:

actuate the intake valve at a beginning of the intake stroke; and actuate a second of the one or more fuel injectors positioned in the main chamber after the gas exchange top dead center piston position; and during the compression stroke of the engine:

actuate the spark plug located in the prechamber immediately prior to the firing top dead center piston position.

11. The TJCCI engine system of claim 9, wherein when the engine operates in the third engine operating map region, the computer system is further configured to:

during the exhaust stroke of the engine:

actuate a first of the one or more fuel injectors in a port of the engine positioned proximate the main chamber; and actuate the exhaust valve;

during the intake stroke of the engine:

actuate the intake valve; and during the compression stroke of the engine:

actuate a second of the one or more fuel injectors positioned in the main chamber at a beginning of the compression stroke; and actuate the spark plug located in the prechamber immediately prior to the firing top dead center piston position.

12. The TJCCI system of claim 9, wherein when the engine operates in the fourth engine operating map region, the computer system is further configured to:

during the exhaust stroke of the engine:

actuate a first of the one or more fuel injectors in a port of the engine positioned proximate the main chamber; and actuate the exhaust valve;

during the intake stroke of the engine:

actuate the intake valve at a middle of the intake stroke; and actuate a second of the one or more fuel injectors positioned in the main chamber at the middle of the intake stroke; and during the compression stroke of the engine:

actuate the spark plug connected to the prechamber immediately prior to the firing top dead center piston position.

13. The TJCCI system of claim 9, wherein when the engine operates in the mode transition region, the computer system is further configured to:

during the exhaust stroke of the engine:

actuate a first of the one or more fuel injectors in a port of the engine positioned proximate the main chamber; and actuate the exhaust valve;

during the intake stroke of the engine:

actuate the intake valve at a beginning of the intake stroke; and actuate a second of the one or more fuel injectors positioned in the main chamber after the gas exchange top dead center piston position;

during the compression stroke of the engine:

actuate the spark plug located in the prechamber to produce a first spark immediately prior to the firing top dead center piston position; and during the expansion stroke of the engine:

actuate the spark plug connected to the prechamber to produce a second spark immediately after the firing top dead center piston position.

14. The TJCCI engine system of claim 9, wherein one of the one or more fuel injectors is positioned in the main chamber and is configured to passively fuel the prechamber.

15. The TJCCI engine system of claim 8, wherein the first and second engine operating map regions are characterized by low engine speed, low engine load, or both.

16. The TJCCI engine system of claim 8, wherein the third engine operating map region is characterized by a low to medium engine speed and a low to medium engine load.

17. A method, comprising:

designing an engine to operate using passive jet ignition combustion under a first set of engine parameters, wherein passive jet ignition combustion comprises:

injecting fuel from a fuel injector into a main chamber of the engine such that an amount of the fuel is directed into a prechamber to provide a prechamber fuel air mixture in the prechamber and a main chamber fuel air mixture in the main chamber, wherein the prechamber is adjacent to and in fluid communication with the main chamber;

generating a spark in the prechamber to ignite the prechamber fuel air mixture; and ejecting the ignited prechamber fuel air mixture from the prechamber into the main chamber to ignite the main chamber fuel air mixture, wherein the first set of engine parameters comprises:

an engine speed ranging from a first minimum speed to a first maximum speed; and an engine load ranging from a first minimum load to a first maximum load, and wherein under the first set of engine parameters, a ratio of fuel to air provided in the main chamber and the prechamber after the injecting is a stoichiometric ratio;

designing the engine to operate using passive jet ignition combustion under a second set of engine parameters, the second set of engine parameters comprising:

the engine speed ranging from greater than the first maximum speed to a second maximum speed; and the engine load ranging from the first minimum load to a second maximum load, designing the engine to change the ratio of fuel to air provided in the main chamber and the prechamber to an ultra-lean ratio when the engine is operated under a third set of engine parameters, wherein under the third set of engine parameters, the engine speed is greater than the first maximum speed and the engine load is greater than the second maximum load, and wherein the ultra-lean ratio comprises more air than fuel; and operating the engine under different engine parameters by conducting the injecting at different times as a piston cycles in the main chamber.

18. The method of claim 17, further comprising:

providing an engine operating map defining multiple regions of engine operation, wherein each region defines the ratio of fuel to air provided in the main chamber and the prechamber under different engine parameters, wherein the multiple regions comprise:

a first region defining the stoichiometric ratio of fuel to air under the first set of engine parameters;

a second region defining the stoichiometric ratio of fuel to air under the second set of engine parameters;

a third region defining the ultra-lean ratio of fuel to air under the third set of engine parameters, wherein the third set of engine parameters further comprise:

the engine speed ranging from greater than the first maximum speed to the second maximum speed; and the engine load ranging from greater than the second maximum load to a third maximum load; and a fourth region defining the stoichiometric ratio of fuel to air under a fourth set of engine parameters, wherein the fourth set of engine parameters comprise:

the engine speed ranging from greater than the first maximum speed to a fourth maximum speed; and the engine load ranging from greater than the third maximum load to the first maximum load.

19. The method of claim 18, wherein the engine operating map further defines the third region as having a first amount of cooled EGR provided with the ultra-lean ratio of fuel to air, and the fourth region as having a second amount of cooled EGR provided with the stoichiometric ratio of fuel to air, wherein the second amount of cooled EGR is greater than the first amount.

* * * * *